US012699531B2

(12) United States Patent　　(10) Patent No.: US 12,699,531 B2
Imel et al.　　(45) Date of Patent: Aug. 4, 2026

(54) REORDERING MEMORY CONTROLLER

(71) Applicant: Rambus Inc., San Jose, CA (US)

(72) Inventors: Michael Thomas Imel, Beaverton, OR (US); Larry Arbuthnot, Portland, OR (US); Charles J. Wilson, Portland, OR (US)

(73) Assignee: RAMBUS INC., San Jose, CA (US)

( * ) Notice: Subject to any disclaimer, the term of this patent is extended or adjusted under 35 U.S.C. 154(b) by 24 days.

(21) Appl. No.: 18/882,333

(22) Filed: Sep. 11, 2024

(65) Prior Publication Data

US 2025/0077124 A1　　Mar. 6, 2025

Related U.S. Application Data

(63) Continuation of application No. 17/481,851, filed on Sep. 22, 2021, now Pat. No. 12,112,063.

(60) Provisional application No. 63/149,200, filed on Feb. 12, 2021, provisional application No. 63/105,531, filed on Oct. 26, 2020.

(51) Int. Cl.
　　*G06F 3/06*　　(2006.01)
　　*G06F 13/16*　　(2006.01)
(52) U.S. Cl.
　　CPC .......... *G06F 3/0659* (2013.01); *G06F 3/0611* (2013.01); *G06F 3/0673* (2013.01); *G06F 13/1626* (2013.01); *G06F 13/1631* (2013.01); *G06F 13/1642* (2013.01)
(58) Field of Classification Search
　　CPC .... G06F 3/0659; G06F 3/0611; G06F 3/0673; G06F 13/1626; G06F 13/1631; G06F 13/1642
　　See application file for complete search history.

(56) References Cited

U.S. PATENT DOCUMENTS

| | | | |
|---|---|---|---|
| 5,239,634 A | 8/1993 | Buch et al. |
| 5,701,434 A | 12/1997 | Nakagawa |
| 6,571,325 B1 | 5/2003 | Satagopan et al. |
| 6,782,460 B2 | 8/2004 | Satagopan et al. |

(Continued)

OTHER PUBLICATIONS

A lecture published Mar. 23, 2015 for Course 18-447—Computer Architecture, Lecture 21: Main Memory for Carnegie Mellon University (Year: 2015).*

(Continued)

*Primary Examiner* — Janice M. Girouard

(74) *Attorney, Agent, or Firm* — Amsel IP Law PLLC; Jason Amsel

(57) ABSTRACT

A memory controller includes a request queue and associated logic for efficiently managing the request queue based on various timing constraints of the memory device. A single request queue for the memory device stores read and write requests spanning different banks of the memory device. In each memory controller cycle, selection logic may select both a row request and a column request (relating to a different bank than the row request) for issuing to the memory device based on a set of timing status bits. Following issuance of requests, the memory controller updates the queue to maintain the queued requests in a time-ordered, compressed sequence. The memory controller furthermore updates the timing status bits that are used by the selection logic to select requests from the queue based on a history of past memory requests.

20 Claims, 5 Drawing Sheets

(56) References Cited

U.S. PATENT DOCUMENTS

| | | | |
|---|---|---|---|
| 7,305,500 B2 | 12/2007 | Adiletta et al. | |
| 8,990,490 B2 | 3/2015 | Gopalakrishnan et al. | |
| 2006/0129764 A1 | 6/2006 | Bellows et al. | |
| 2008/0091906 A1* | 4/2008 | Brittain ................ | A61C 17/349 |
| | | | 711/E12.001 |
| 2008/0189501 A1 | 8/2008 | Irish et al. | |
| 2012/0155200 A1* | 6/2012 | Moon ...................... | G11C 8/12 |
| | | | 365/230.01 |
| 2012/0260032 A1* | 10/2012 | Chiu ................... | G06F 13/1626 |
| | | | 711/105 |
| 2013/0246682 A1 | 9/2013 | Jandhyam | |
| 2014/0297985 A1 | 10/2014 | Graefe et al. | |

OTHER PUBLICATIONS

Prior art showing a register is just a memory address/location. (Year: 2020).*

Merriam Webster definition of "respective" based on a snapshot of the web page https://www.merriam-webster.com/dictionary/respective taken Oct. 22, 2020. 1 page.

Mutlu, Onur Prof., "Computer Architecture Lecture 21 : Main Memory", Set of Lecture Notes by Prof. Onur Mutlu, Published Mar. 23, 2015 for Course 18-447, Carnegie Mellon University, 2015. 94 pages.

Web Article: "Introduction to Memory and Memory Units", The Wayback Machine—https://web.archive.org/web/20201027153215/https://www.geeksforgeeks.org. Downloaded: Apr. 4, 2023. 5 pages.

* cited by examiner

REORDERING MEMORY CONTROLLER

CROSS-REFERENCE TO RELATED APPLICATIONS

This application is a continuation of U.S. patent application Ser. No. 17/481,851 filed on Sep. 22, 2021, now U.S. Pat. No. 12,112,063, which claims the benefit of U.S. Provisional Patent Application No. 63/105,531 filed on Oct. 26, 2020 and U.S. Provisional Patent Application No. 63/149,200 filed on Feb. 12, 2021, which are each incorporated by reference herein.

BACKGROUND

A memory system includes a memory controller that controls memory operations of one or more memory devices. In order to operate the memory system with high performance, it is desirable to efficiently manage the issuing of memory requests from the memory controller based on various timing constraints of the memory devices.

BRIEF DESCRIPTION OF THE DRAWINGS

The teachings of the embodiments herein can be readily understood by considering the following detailed description in conjunction with the accompanying drawings.

DETAILED DESCRIPTION OF EMBODIMENTS

A memory controller includes a request queue and associated logic for efficiently managing the request queue based on various timing constraints of the memory device. A single request queue for the memory device stores requests spanning different banks of the memory device. In each memory controller cycle, selection logic may select both a row request and a column request (relating to a different bank than the row request) for issuing to the memory device based on a set of status bits. Following issuance of the requests, the memory controller updates the queue to maintain the queued requests in a time-ordered, compressed sequence. The memory controller furthermore updates the status bits that are used by the selection logic to select requests from the queue based on a history of past memory requests.

Figure 1:
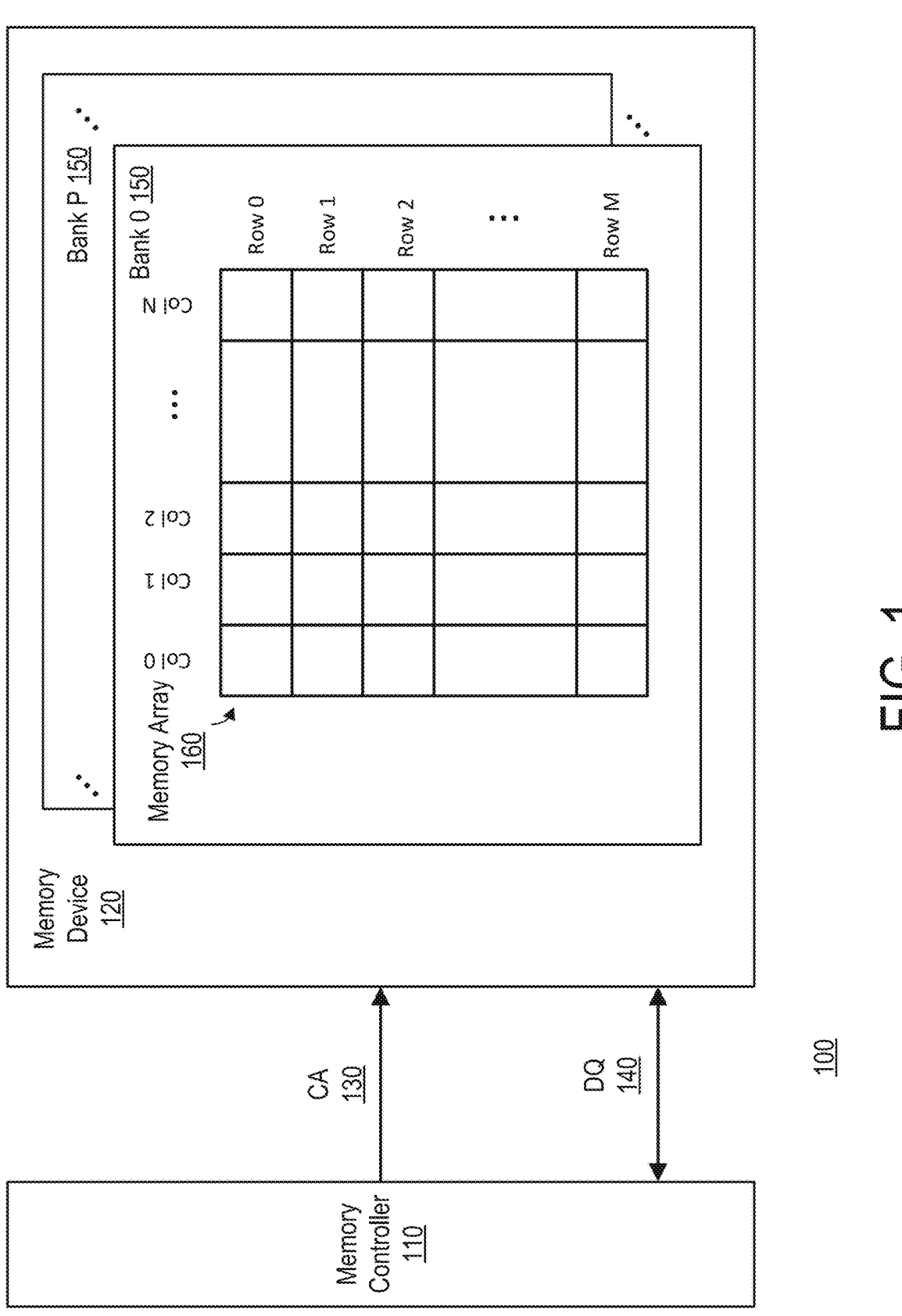
FIG. 1 is a block diagram illustrating an example embodiment of a memory system.

FIG. 1 illustrates an embodiment of a memory system 100 comprising a memory controller 110 coupled to a memory device 120. The memory controller 110 and the memory device 120 communicate via a plurality of communication links including a data link (DQ) 140 and at least one command/address (CA) link 130.

The memory device 120 may be a DRAM (dynamic random-access memory), SRAM (static random-access memory), a non-volatile memory such as a flash memory, or any other type of memory device. The memory device 120 includes a plurality of banks 150 that each comprise a memory array 160 arranged in rows and columns. In order to control operations of the memory device 120, the memory controller 110 issues requests to the memory device 120 via the at least one command/address link 130. The requests may specify a type of the request and an address (or ranges of addresses) associated with the request. The requests may include row requests that pertain to an entire row of a memory array 160 in a bank 150 or column requests that pertain to a specific column. Here, row requests may include, for example, row refresh requests (including all-bank refresh requests and single bank refresh requests), row precharge requests, or row activation requests. Column requests may include read requests or write requests. The row requests and column requests may operate together to achieve a particular memory operation. For example, prior to read or writing to a specific memory address, the memory controller 110 may send an activate request to activate a row associated with the specific memory address. Once the row is activated, the memory controller 110 sends a read or write request (as a column request) associated with a column of the activated row. In a write operation, the memory controller 110 furthermore sends data via the data link 140 to be written to the specified memory location. In a read operation, the memory device 120 reads the data from the specified memory address and outputs it to the memory controller 110 via the data link 140. In various embodiments, the one or more CA links 130 may include a single CA link 130 or separate CA links 130 for row requests and column requests.

The memory device 120 operates with various constraints relating to the timing of different types of requests. For example, in a typical memory device 120, only one row within a given bank 150 may be activated at a given time. Thus, in order to perform consecutive memory operations on memory addresses in different rows of the same bank 150, the memory device 120 first activates and operates on a first row, then de-activates the first row, and then activates and operates on the second row. Furthermore, the memory device 120 typically exhibits larger delay when switching between executing read and write requests relative to executing consecutive read requests or consecutive write requests. The memory device 120 can execute a row request and a column request in a same memory cycle as long as the row request involves a different bank 150 than the column request. However, the memory device 120 cannot typically execute more than one row request or more than one column request in the same memory cycle.

In view of these various constraints on the operation of the memory device 120, the operational efficiency of the memory device 120 is dependent on the order in which it receives requests. For example, it is more efficient for the memory device 120 to execute a sequence of write requests pertaining to a first row followed by a sequence of write requests pertaining to a second row in the same bank 150, than for the memory device 120 to alternate between writing to the first row and the second row of the same bank 150. Similarly, it is more efficient for the memory device 120 to execute a sequence of write commands followed by a sequence of read requests than to alternate between read and write requests. Based on the various constraints of the memory device 120, the memory controller 110 may intelligently determine an order for issuing requests to the memory device 120 to efficiently operate on the memory device 120.

The memory controller 110 and the memory device 120 may include additional components that are omitted from the FIG. 1 for simplicity of illustration. In one embodiment, the memory controller 110 and the memory device 120 may be implemented as separate dies within the same package. In other embodiments, they are implemented in their own respective packages.

Figure 2:
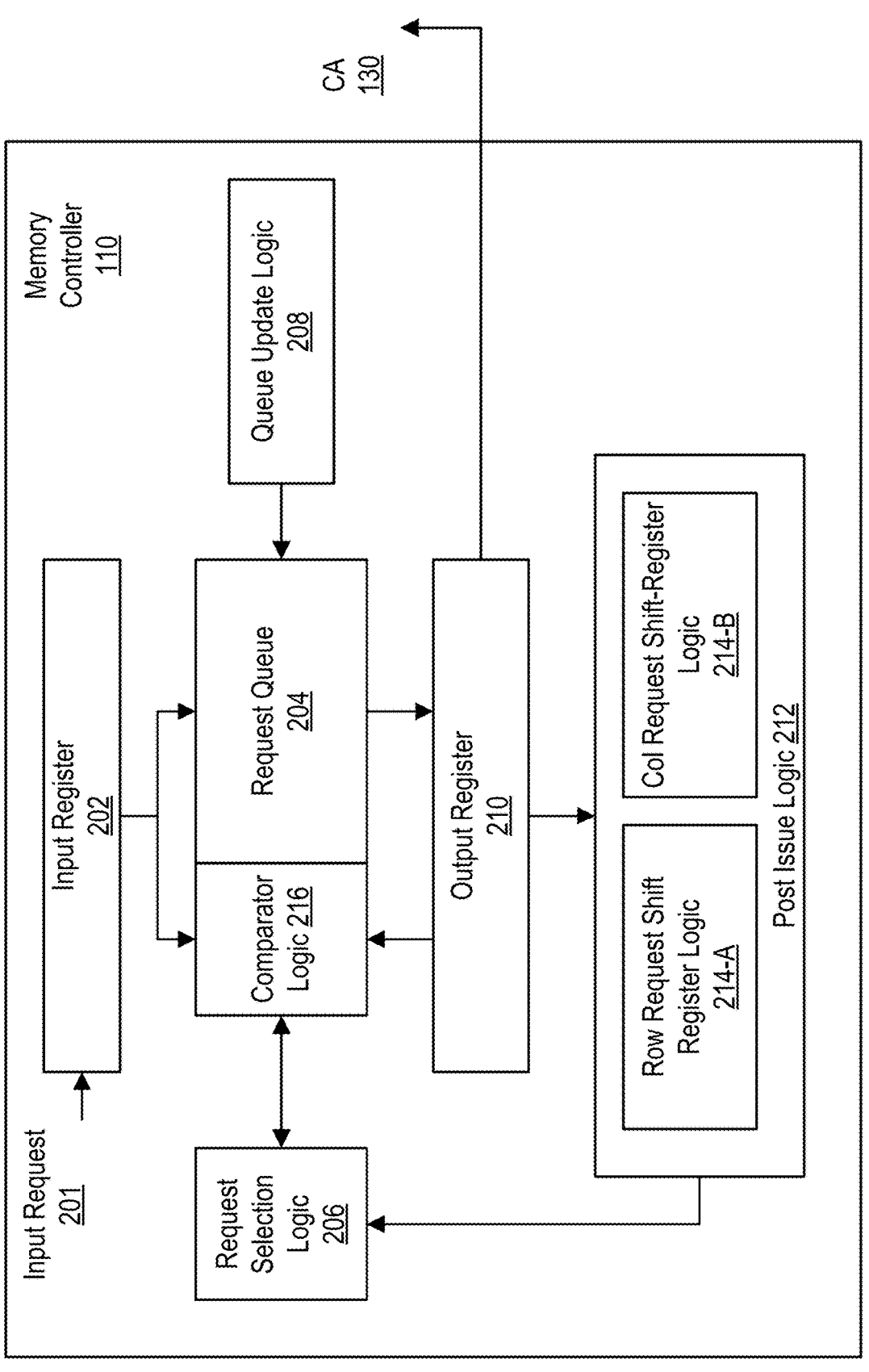
FIG. 2 is a block diagram illustrating an example embodiment of a memory controller with a reordering request queue.

FIG. 2 is a block diagram illustrating an example embodiment of a memory controller 110 for controlling issuance of memory requests to one or more memory devices 120. The memory controller 110 includes an input register 202, a request queue 204 including comparator logic 216, request selection logic 206, queue update logic 208, an output register 210, and post-issue logic 212, which includes row request shift register logic 214-A and col request shift register logic 214-B.

The request queue 204 stores a queue of memory requests to be transmitted to the memory device 120. The request queue 204 includes a fixed number of ordered request slots that can each be filled by a memory request or may be empty during any given memory controller cycle. In an embodiment, a single request queue 204 is used for all banks 150 of the memory device 120 such that different requests in the request queue 204 may pertain to different banks 150. During each memory controller cycle in which there is at least one immediately issuable request in the request queue 204, the request selection logic 206 selects a memory request from the request queue 204 for issuing to the memory device 120. The selected request is loaded into the output register 210 and sent to the memory device 120.

In an embodiment, a single slot of a request queue 204 may hold multiple related requests. For example, a single slot in the request queue 204 may include a row request to activate a relevant row of the memory device 120 and the related one or more column requests to read or write to columns in the activated row. The related requests 204 may be issued during different memory controller cycles. For example, the activate request may be issued in a first memory controller cycle and the read or write request may be issued in a subsequent memory controller cycle after the row is activated. In this case, the slot is vacated only when all related requests in the slot are issued.

A new memory request (or set of related requests that can fill a single slot) may furthermore be added to the request queue 204 from the input register 202 in each memory controller cycle and a new input request 201 may be loaded to the input register 202. Here, the input requests 201 may be pre-processed from an original format to conform to a predefined set of constraints. For example, requests that relate to operations affecting multiple different rows may be divided into separate requests with each request relating only to a single row of a single bank 150. In other cases, multiple column requests relating to the same bank 150 and row may be combined in a single request slot.

In a single memory controller cycle, one row request and one column request may be concurrently issued from the request queue 204 via the output register 210. Furthermore, a new request (or set of related requests filling a single request slot) may be added to the request queue 204 via the input register 202 concurrently with issuing the one or more requests in a given memory controller cycle.

The queue update logic 208 manages the ordering of requests in the request queue 204 whenever it is updated due to a slot being vacated, a new slot being filled, or both. The queue update logic 208 manage the ordering of the requests in the request queue 204 so that the requests are time-ordered (e.g., with the oldest requests at the bottom and the newest requests at the top). Furthermore, the queue update logic 208 manages the request queue 204 such that the requests are compressed towards the end of the request queue 204 associated with the oldest requests. For example, requests may be compressed towards the bottom of the request queue 204 with vacant slots only possible in the uppermost slots of the request queue 204. Here, when beginning to fill an empty request queue 204, the queue update logic 208 places the first request into the lowest-most slot, the second request into the second-lowest slot, and so on. If a slot is vacated by an issued request, all requests above it in the request queue 204 are shifted down to maintain the time-ordering and compression.

The request selection logic 206 selects one or more requests from the request queue 204 for issuing during each memory controller cycle based on predefined selection criteria. Here, the request selection logic 206 selects requests based on the timing constraints of the memory device 120 to order issuance of the requests in a manner that can optimize efficiency of the memory device 120. In an embodiment, the request selection logic 206 tracks, in each memory controller cycle, which requests in the request queue 204 are ready to issue in the current memory controller cycle and which requests cannot issue until a subsequent memory controller cycle. For example, a memory request may not be ready for issuance in a given memory controller cycle because the address location is not currently accessible, the relevant bank/row is not activated, a relevant bus is busy, because of coherency considerations (e.g., to ensure that when a read request enters the queue 204 after a write request to the same memory location, the requests are issued from the queue 204 in the same order) or other reasons dependent on the architecture of the memory system 100. The request selection logic 206 furthermore tracks the types of previously issued requests (e.g., read or write) to determine relevant efficiency of selecting a request of a particular type during the current memory controller cycle.

The request selection logic 206 may employ different techniques to choose which request to issue from the request queue 204. In one embodiment, the request selection logic 206 may select between the requests based on factors such as whether or not the request is immediately ready to issue, the relative ages of the requests in the request queue 204, the type of request (e.g., read or write) relative to the history of prior request types, or other factors. For example, absent other factors, the request selection logic 206 will select the oldest immediately issuable request in the request queue 204 provided such a request exists. Here, because the request queue 204 is time-ordered, the relative ages of the requests can be determined solely based on their relative positions within the request queue 204. In another example, absent other factors, the request selection logic 206 may give preference to the oldest read request or oldest write request associated with rows that are already activated relative to requests that are associated with inactivated rows. The request selection logic 206 may furthermore include coherency logic to ensure that a newer read request to a specific address is not selected prior to an older write request to the same address, so that the read command will get the updated value written to the memory address X. Furthermore, absent other determinative factors such as coherency, the request selection logic 206 may be more likely to select a request of a same type as the immediate previously issued request, even if the request is less old than another request in the queue of a different type to limit frequency of switching between read and write requests. In other instances, the request selection logic 206 may select an oldest request in the request queue that has exceeded an age-out time, even if the request is not immediately ready to be issued to the memory device 120.

In an embodiment, the request selection logic 206 can select both a row request (e.g., an activate, precharge or refresh request) and a column request (e.g., a read or write request) from the request queue 204 in each memory controller cycle. Thus, for example, the request select logic 206 can issue a column request to write to a row in a first memory bank, while concurrently issuing a row request to activate a row of a second memory bank.

In an embodiment, the request queue 204 includes comparator logic 216 comprising a set of comparators for each entry in the request queue 204 including a first comparator for comparing the an address of an entry in the request queue 204 against an address of an incoming request from the input register 202, and a second comparator for comparing the address of the entry in the request queue 204 against an address of an outgoing request from the output register 210 (or multiple outgoing requests if both row and column requests are issued in a same memory controller cycle). The comparator logic 216 generates status bits that are stored for each entry in the request queue 204 that indicate relative timing constraints of each request to other requests in the request queue 204. The status bits for a particular request in the request queue 204 may indicate that the request should issue before or after another request in the request queue 204 based on constraints relating to the types of requests and the memory addresses. For example, when a new request enters the request queue 204, a first comparator compares the new request against each of the requests in the request queue 204 and may configure status bits to identify requests in the request queue 204 that must issue before the new request (e.g., because they pertain to the same memory address). The second comparator compares exiting requests against each of the requests in the request queue 204 and may further update the status bits (e.g., to indicate requests that are now ready to issue based on the exiting request being issued). The status bits can be updated at each memory controller cycle. The status bits can then be used by the request selection logic 206 to determine which request or set of requests to select in a given memory controller cycle.

The post-issue logic 212 track a history of the requests issued to the memory device 120 and may further be used to update the timing status bits for each bank that are applied by the request selection logic 206 to determine which requests to select in any given memory controller cycle. Here, the post-issue logic 212 may generate information about when a next or new activate or refresh can be issued to a bank, when a read or write request can be issued after an activate request to the same bank, or when a read request can be issued after a write request that enables the request selection logic 206 to update status bits and efficiently select requests from the request queue 204. The post-issue logic 212 may include a separate row request shift register logic 214-A for tracking histories and updating status bits associated with row requests, and a column request shift register logic 214-B for tracking histories and updating status bits associated with column requests. An embodiment of an architecture that can be used for both the row request or column request shift register logic 214 is described in further detail in FIG. 4.

Figure 3:
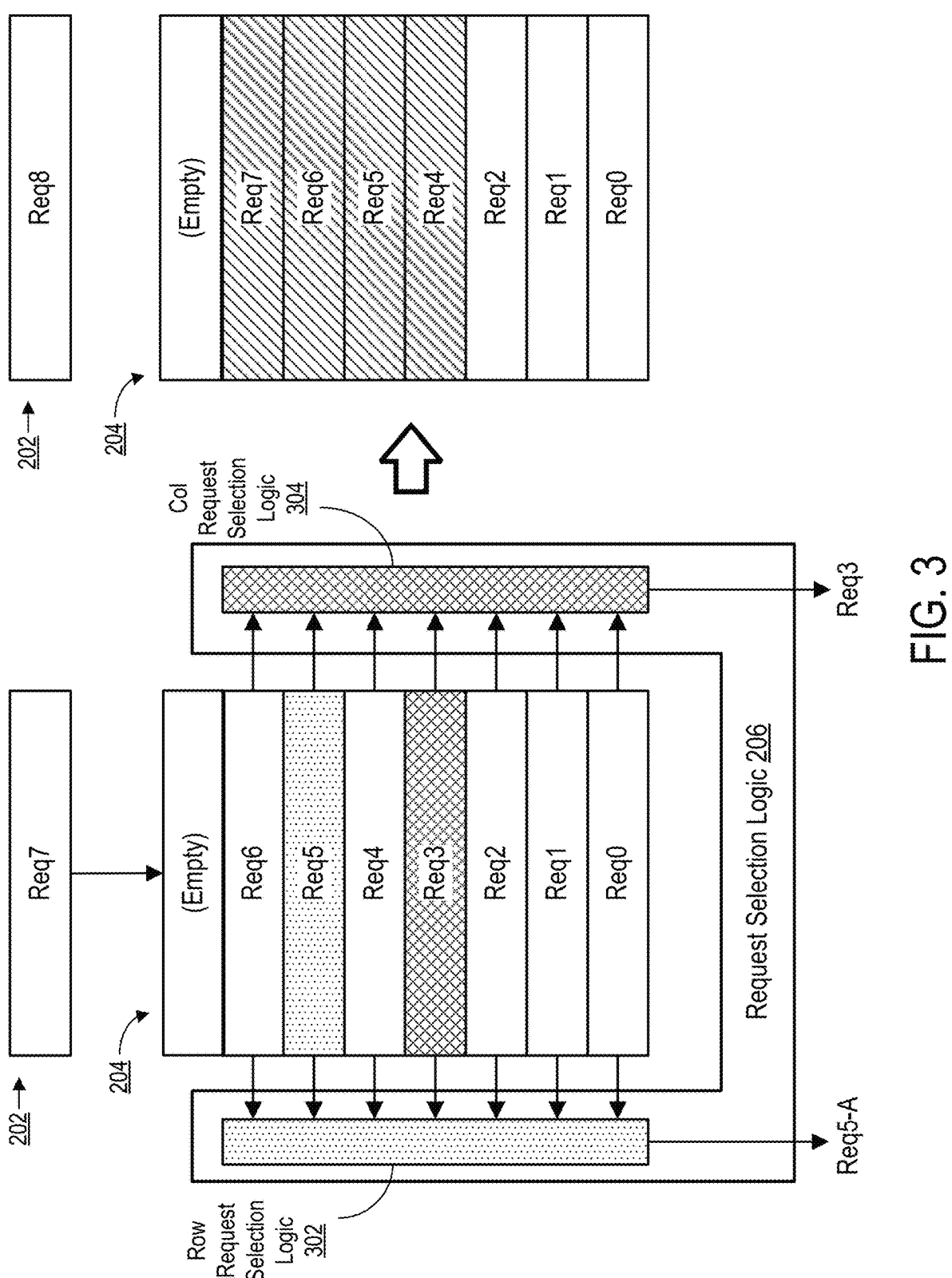
FIG. 3 is a diagram illustrating an example technique for managing a request queue of a memory controller.

FIG. 3 illustrates an example of a technique for managing a request queue 204. In this example, a request queue 204 includes memory requests Req0, . . . , Req6. There is a vacant slot at the top of the request queue 204. As explained above, each request Req0, . . . . Req6 may actually contain multiple related requests that may issue over different memory controller cycles. The request queue 204 is time-ordered such that Req0 contains the oldest request in the request queue 204 and Req6 contains the newest request in the request queue 204. The request selection logic 206 includes column request selection logic 304 that can select a column request and row request selection logic 302 that can select a row request in the current memory controller cycle. In the illustrated example, the row request selection logic 302 selects a row request associated with request Req5 and the column request selection logic 304 selects a column request associated with request Req3. Here, the row request associated with Req5 does not complete the request Req5 (e.g., there could still be an associated column request in the same request slot) and thus the request slot associated with Req5 is not vacated in this memory controller cycle. In this example, the column request associated with Req3 completes the request and the request slot associated with Req3 is vacated.

To update the request queue 204, a block of more recent requests above the slot vacated by Req3 (i.e., the block of request slots Req4, Req5, and Req6) is shifted down such that Req4 fills the slot vacated by Req3, Req5 fills the slot vacated by Req4, and Req6 fills the slot vacated by Req5. Furthermore, a new request, Req7, is shifted into the lowermost vacant slot in the request queue 204 at the top of the block, in this case the slot vacated by Req6, thus leaving the topmost slot still vacant. Therefore, upon updating, the memory queue 204 remains time-ordered and compressed.

Figure 4:
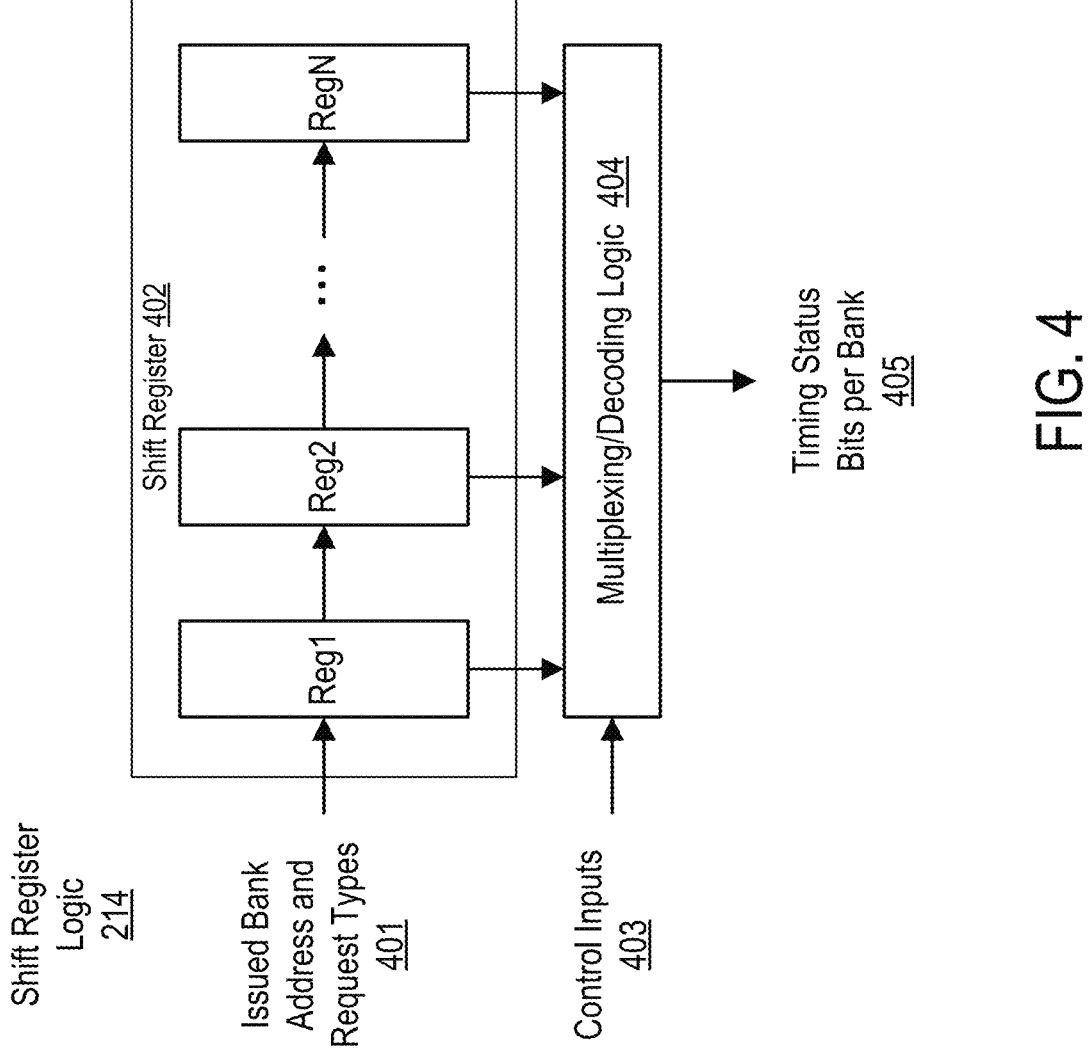
FIG. 4 is a block diagram illustrating an example embodiment of post-issue logic for a memory controller.

FIG. 4 is a block diagram illustrating an example embodiment of the shift register logic 214, that can correspond to either the row request shift-register logic 214-A or the column request shift register logic 214-B. Here, the shift register logic 214 comprises a shift register 402 (including registers Reg1, . . . , RegN) and a multiplexing/decoding logic 404. The shift register 402 stores a history of issued memory column requests or memory row request types, together with the associated bank address bits that are serially shifted into the shift register 402 via the input data 401 as the requests are issued. Thus, the requests in the shift register 402 are time-ordered based on issuance. Multiple memory configuration timing values (selected from a predefined set of selectable values) are supplied as control inputs 403. Each supplied memory timing configuration value controls the multiplexing/decoding logic 404 to select (mux) one or more taps of the shift-register 402 and update memory timing status bits 405 for a particular memory bank. Timing status for multiple banks (one bank for each timing configuration value supplied) can be outputted each cycle using multiple taps of the shift register 402).

This architecture enables the post-issue logic 212 to provide various information used by the request selection logic 206 to determine which of the requests to select from the request queue 204 in a given cycle. For example, the timing status bits 405 include timing information about when a next or new activate or refresh can be issued to a bank 150, when a read or write can be issued after an activate to the same bank 150, when a read can be issued after a write, etc.

As described above, the shift register logic 214 illustrated in FIG. 4 can be duplicated as row request shift register logic 214-A and col request shift register logic 214-B, where each shift register 402 records and shifts the bank address together with request type status bits associated with the bank request. The timing status bits decoded per bank from the separate shift registers 402 are used by the request selection logic 206 for timing information relating to row or column requests associated with a particular bank 150.

Figure 5:
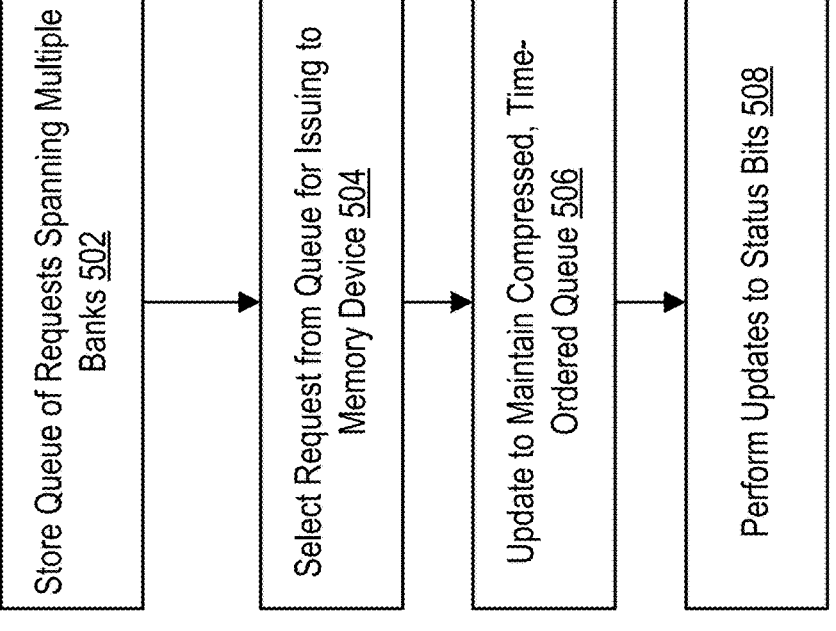
FIG. 5 is a flowchart illustrating an example embodiment of a process for managing a request queue of a memory controller.

FIG. 5 is a flowchart illustrating an example embodiment of a process for operating a memory controller 110. The memory controller 110 stores 502 a request queue 204 including requests spanning multiple memory banks. During a given memory controller cycle, the memory controller 110 selects 504 at least one request from the request queue 204 for issuing to a memory device 120 based on a set of timing status bits. The memory controller 110 updates 506 the request queue 204 to maintain a compressed time-ordered queue. For example, if the request slot is vacated upon issuance of the selected request and a new request is available in the input register 202, the memory controller 110 shifts down a block of requests above the vacated slot and shifts in the new request into the available slot in the request queue 204 at the top of block. The memory controller 110 furthermore performs 508 an update to update the timing status bits used to select between requests in the request queue 204 in future memory controller cycles.

Upon reading this disclosure, those of ordinary skill in the art will appreciate still alternative structural and functional designs and processes for the described embodiments, through the disclosed principles of the present disclosure. Thus, while particular embodiments and applications of the present disclosure have been illustrated and described, it is to be understood that the disclosure is not limited to the precise construction and components disclosed herein. Various modifications, changes and variations which will be apparent to those skilled in the art may be made in the arrangement, operation and details of the method and apparatus of the present disclosure herein without departing from the scope of the disclosure as defined in the appended claims.

What is claimed is:

1. A method for queuing memory operation requests, the method comprising:
   storing a queue of memory operation requests ordered based on relative times of receipt in a fixed set of ordered request slots, the memory operation requests associated with multiple different memory banks of a memory device, wherein at least one of the ordered request slots stores a request pair including both a first row request for activating a row of a first bank and a corresponding first column request for performing a read or write for the row of the first bank;
   storing a new request in an input register;
   selecting, in a given memory controller cycle based on ordering constraints and relative positions of the memory operation requests in the fixed set of ordered request slots indicating the relative times of receipt, the first row request for activating the row of the first bank, and concurrently selecting a second column request for issuing to a second bank separate from the first bank, wherein the first row request and the second column request are selected in the same memory controller cycle;
   updating the queue to remove the second column request from the queue and to shift at least a subset of remaining requests between the ordered request slots such that a slot vacated by the second column request is filled and a slot corresponding to the request pair remains filled by the first column request, and to add the new request from the input register to the ordered request slots adjacent to the shifted subset of remaining requests in the queue, wherein the requests are maintained in the queue in time order and positioned in a compressed set of adjacent slots of the fixed set of ordered request slots; and issuing the first row request and the second column request from an output register to the first and second banks of the memory device during the same memory controller cycle.

2. The method of claim 1, wherein updating the queue comprises:
   shifting a block of requests in the queue that are newer than the second column request to fill the one or more slots vacated by the second column request; and
   shift in the new request to a vacated slot at a top of the block.

3. The method of claim 1, wherein updating the queue comprises:
   determining if the second column request is completed; and
   updating the queue in response to determining that the second column request is completed.

4. The method of claim 1, wherein selecting the first row request and the second column request comprises:
   identifying the first row request and the second column request as oldest requests in the queue that can be issued to the memory device in a current memory controller cycle.

5. The method of claim 1, wherein selecting the first row request and the second column request comprises:
   identifying the first row request and the second column request as oldest requests in the queue that have reached an age timeout.

6. The method of claim 1, wherein selecting the second column request comprises:
   determining a type of an immediately prior issued request as either a read request or a write request; and
   identifying the second column request as a request that is of a same type as the prior issued request.

7. The method of claim 1, further comprising:
   shifting a bank address and request type associated with the issued request into a post-issue shift register;
   selecting one or more taps from the post-issue shift register based on control inputs; and
   decoding the one or more taps to update status bits representing the ordering constraints.

8. The method of claim 1, wherein selecting the first row request and the second column request comprises:
   performing comparisons for each request in the queue, an address of the request in the queue with an address of the first row request and the second column request being removed from the queue and an address of the new request being added to the queue, to update status bits representing the ordering constraints based on the comparisons, and to select the first row request and the second column request based on the status bits.

9. The method of claim 1, further comprising:
   receiving a memory request;
   identifying that the memory request includes operations associated with multiple different banks of the memory device; and
   dividing the memory request into a set of multiple requests in which each of the multiple requests requires access to only a single bank.

10. A memory controller for queuing memory operation requests, the memory controller comprising:
   a queue to store memory operation requests ordered based on relative times of receipt in a fixed set of ordered request slots, the memory operation requests associated with multiple different memory banks of a memory device, wherein at least one of the ordered request slots stores a request pair including both a first row request for activating a row of a first bank and a corresponding first column request for performing a read or write for the row of the first bank;

an input register to store a new request;

request selection logic to select, in a given memory controller cycle based on ordering constraints and relative positions of the memory operation requests in the fixed set of ordered request slots indicating the relative times of receipt, the first row request for activating the row of the first bank, and concurrently selecting a second column request for issuing to a second bank separate from the first bank, wherein the first row request and the second column request are selected in the same memory controller cycle;

queue update logic to update the queue to remove the second column request from the queue and to shift at least a subset of remaining requests between the ordered request slots such that a slot vacated by the second column request is filled and a slot corresponding to the request pair remains filled by the first column request, and to add the new request from the input register to the ordered request slots adjacent to the shifted subset of remaining requests in the queue, wherein the requests are maintained in the queue in time order and positioned in a compressed set of adjacent slots of the fixed set of ordered request slots; and an output register to receive the first row request and the second column request, and to issue the first row request and the second column request to separate banks of the memory device during the same memory controller cycle.

11. The memory controller of claim 10, wherein the queue update logic is configured to shift a block of requests in the queue that are newer than the second column request to fill the one or more slots vacated by the second column request, and to shift in the new request to a vacated slot at a top of the block.

12. The memory controller of claim 10, wherein the queue update logic is configured to determine if the second column request is completed, and update the queue in response to determining that the second column request is completed.

13. The memory controller of claim 10, wherein the request selection logic is configured to identify the first row request and the second column request as oldest requests in the queue that can be issued to the memory device in a current memory controller cycle.

14. The memory controller of claim 10, wherein the request selection logic is configured to identify the first row request and the second column request as oldest requests in the queue that have reached an age timeout.

15. The memory controller of claim 10, wherein the request selection logic is configured to determine a type of an immediately prior issued column request as either a read request or a write request, and identify the second column request as a request that is of a same type as the prior issued request.

16. The memory controller of claim 15, further comprising post-issue logic including:

a post-issue shift register to shift in a bank address and request type associated with the issued request;

a multiplexer to select one or more taps of the post-issue shift register based on control inputs; and decoding logic to decode the one or more taps to update status bits representing the ordering constraints.

17. The memory controller of claim 10, wherein the request selection logic includes:

comparator logic to perform comparisons for each request in the queue, an address of the request in the queue with an address of the first row request and the second column request being removed from the queue, to compare the address of the request in the queue to an address of the new request being added to the queue, and to update status bits representing the ordering constraints based on the comparisons; and selection logic to select the first row request and the second column request based on the status bits.

18. A memory system comprising:

a memory device; and a memory controller for queuing memory operation requests, the memory controller comprising:

a queue to store memory operation requests ordered based on relative times of receipt in a fixed set of ordered request slots, the memory operation requests associated with multiple different memory banks of a memory device, wherein at least one of the ordered request slots stores a request pair including both a first row request for activating a row of a first bank and a corresponding first column request for performing a read or write for the row of the first bank;

an input register to store a new request;

request selection logic to select, in a given memory controller cycle based on ordering constraints and relative positions of the memory operation requests in the fixed set of ordered request slots indicating the relative times of receipt, the first row request for activating the row of the first bank, and concurrently selecting a second column request for issuing to a second bank separate from the first bank, wherein the first row request and the second column request are selected in the same memory controller cycle;

queue update logic to update the queue to remove the second column request from the queue and to shift at least a subset of remaining requests between the ordered request slots such that a slot vacated by the second column request is filled and a slot corresponding to the request pair remains filled by the first column request, and to add the new request from the input register to the ordered request slots adjacent to the shifted subset of remaining requests in the queue, wherein the requests are maintained in the queue in time order and positioned in a compressed set of adjacent slots of the fixed set of ordered request slots; and an output register to receive the first row request and the second column request, and to issue the first row request and the second column request to separate banks of the memory device during the same memory controller cycle.

19. The memory system of claim 18, wherein the queue update logic is configured to shift a block of requests in the queue that are newer than the first row request and the second column request to fill the one or more slots vacated by the first row request and the second column request, and to shift in the new request to a vacated slot at a top of the block.

20. The memory system of claim 18, wherein the queue update logic is configured to determine if the first row request and the second column request are completed, and update the queue in response to determining that the first row request and the second column request are completed.

* * * * *